(12) United States Patent
Maruta et al.

(10) Patent No.: US 12,276,359 B2
(45) Date of Patent: Apr. 15, 2025

(54) THREADED CONNECTION FOR PIPE

(71) Applicants: NIPPON STEEL CORPORATION, Tokyo (JP); VALLOUREC OIL AND GAS FRANCE, Aulnoye-Aymeries (FR)

(72) Inventors: Satoshi Maruta, Tokyo (JP); Yousuke Oku, Tokyo (JP); Pierre Martin, Meudon (FR); Daly Daly, Meudon (FR)

(73) Assignees: NIPPON STEEL CORPORATION, Tokyo (JP); VALLOUREC OIL AND GAS FRANCE, Aulnoye-Aymeries (FR)

( * ) Notice: Subject to any disclaimer, the term of this patent is extended or adjusted under 35 U.S.C. 154(b) by 0 days.

(21) Appl. No.: 17/756,518

(22) PCT Filed: Dec. 22, 2020

(86) PCT No.: PCT/JP2020/047837
§ 371 (c)(1),
(2) Date: May 26, 2022

(87) PCT Pub. No.: WO2021/145163
PCT Pub. Date: Jul. 22, 2021

(65) Prior Publication Data
US 2022/0412486 A1    Dec. 29, 2022

(30) Foreign Application Priority Data
Jan. 17, 2020   (JP) ................................ 2020-005809

(51) Int. Cl.
*F16L 15/00*       (2006.01)

(52) U.S. Cl.
CPC .................................. *F16L 15/007* (2013.01)

(58) Field of Classification Search
CPC ....... F16L 15/007; F16L 15/002; F16L 15/06; E21B 17/0423
See application file for complete search history.

(56) References Cited

U.S. PATENT DOCUMENTS

| 2,992,019 | A | * | 7/1961 | MacArthur | ......... E21B 17/0423 |
| | | | | | 285/334.4 |
| 4,377,302 | A | | 3/1983 | Kohyama et al. | |
| | | | | (Continued) | |

FOREIGN PATENT DOCUMENTS

| CN | 108868658 A | 11/2018 |
| CN | 109563951 A | 4/2019 |

(Continued)

*Primary Examiner* — David Bochna
(74) *Attorney, Agent, or Firm* — GREER BURNS & CRAIN, LTD.

(57) ABSTRACT

A threaded connection for pipe in which the axial distance between the box intermediate shoulder surface and the box end shoulder surface of the box before make-up, $L_B$, is larger than the axial distance between the pin intermediate shoulder surface and the pin end shoulder surface of the pin before make-up, $L_P$, such that, upon completion of make-up, the pin and box intermediate shoulder surfaces and are in contact and function as torque shoulders, while the pin and box end shoulder surfaces are in light (or no) contact. The difference between the axial distances, $(L_B-L_P)$, is such that, when the pin and box are made up and upon application of an axial compressive load, the pin and box are slightly axially compressed by the compressive load and the pin end shoulder surface comes into pressure contact with the box end shoulder surface to bear part of the compressive load.

8 Claims, 7 Drawing Sheets

(56) References Cited

U.S. PATENT DOCUMENTS

| | | | |
|---|---|---|---|
| 4,521,042 A * | 6/1985 | Blackburn | E21B 17/0423 |
| | | | 285/391 |
| 4,570,982 A * | 2/1986 | Blose | E21B 17/0423 |
| | | | 285/390 |
| 4,662,659 A * | 5/1987 | Blose | F16L 15/007 |
| | | | 285/334 |
| 5,423,579 A | 6/1995 | Blose et al. | |
| 2005/0248153 A1 | 11/2005 | Sugino et al. | |
| 2013/0181442 A1 | 7/2013 | Sonobe et al. | |
| 2017/0167641 A1 | 6/2017 | Daly et al. | |
| 2018/0328119 A1 * | 11/2018 | Juarez | F16L 15/002 |
| 2018/0363813 A1 | 12/2018 | Nose et al. | |
| 2019/0040978 A1 | 2/2019 | Oku et al. | |
| 2019/0203857 A1 | 7/2019 | Maruta et al. | |
| 2019/0338872 A1 | 11/2019 | Sugino et al. | |
| 2021/0247004 A1 * | 8/2021 | Briane | F16L 15/002 |
| 2021/0341084 A1 * | 11/2021 | Kawai | F16L 15/007 |
| 2022/0412486 A1 * | 12/2022 | Maruta | E21B 17/0423 |

FOREIGN PATENT DOCUMENTS

| | | | |
|---|---|---|---|
| JP | 1982186690 A | 11/1982 | |
| JP | 1985500458 A | 4/1985 | |
| JP | 2006526747 A | 11/2006 | |
| JP | 2012149760 A | 8/2012 | |
| JP | 2018536818 A | 12/2018 | |
| WO | 2017104282 A1 | 6/2017 | |
| WO | 2018135266 A1 | 7/2018 | |

* cited by examiner

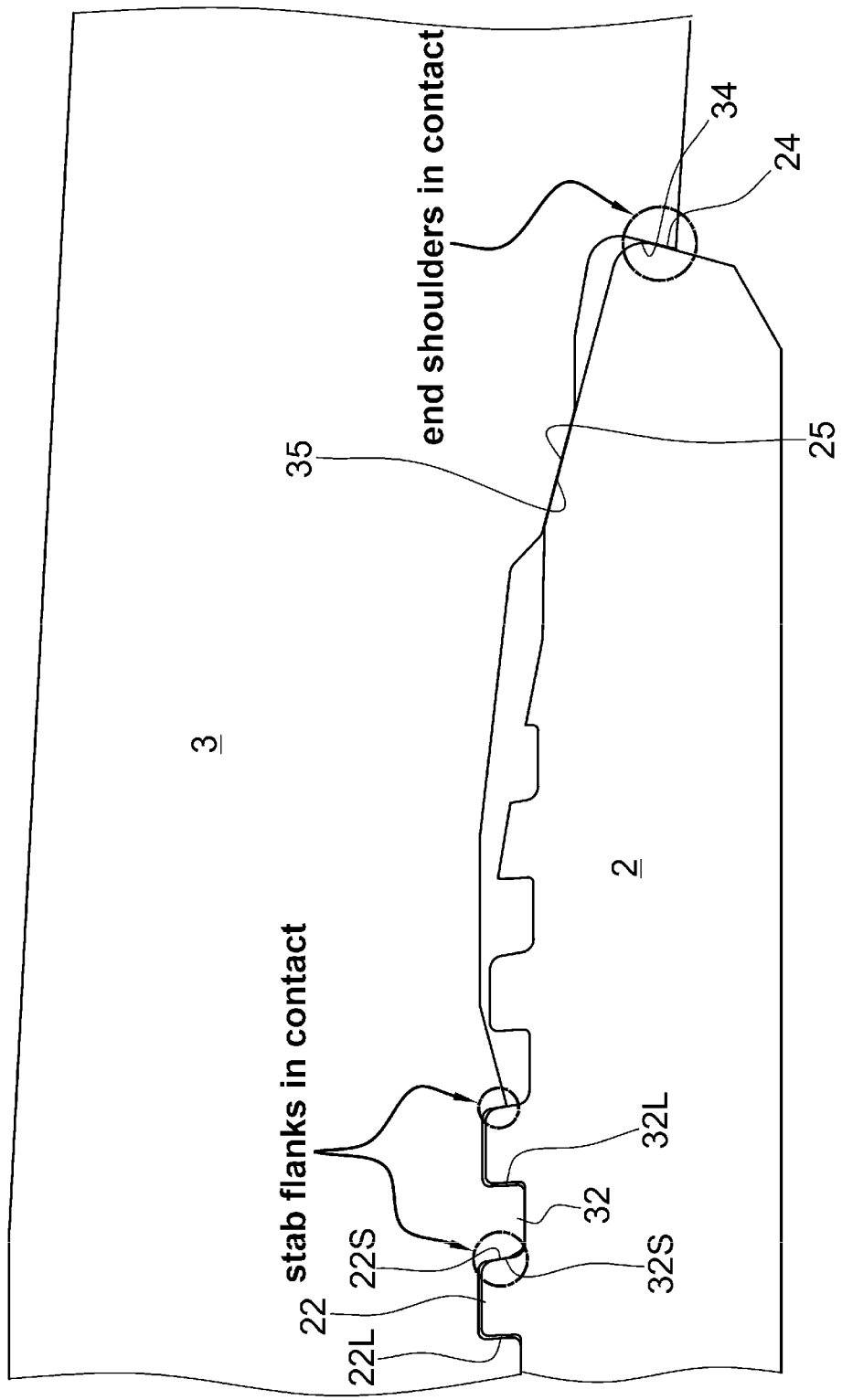

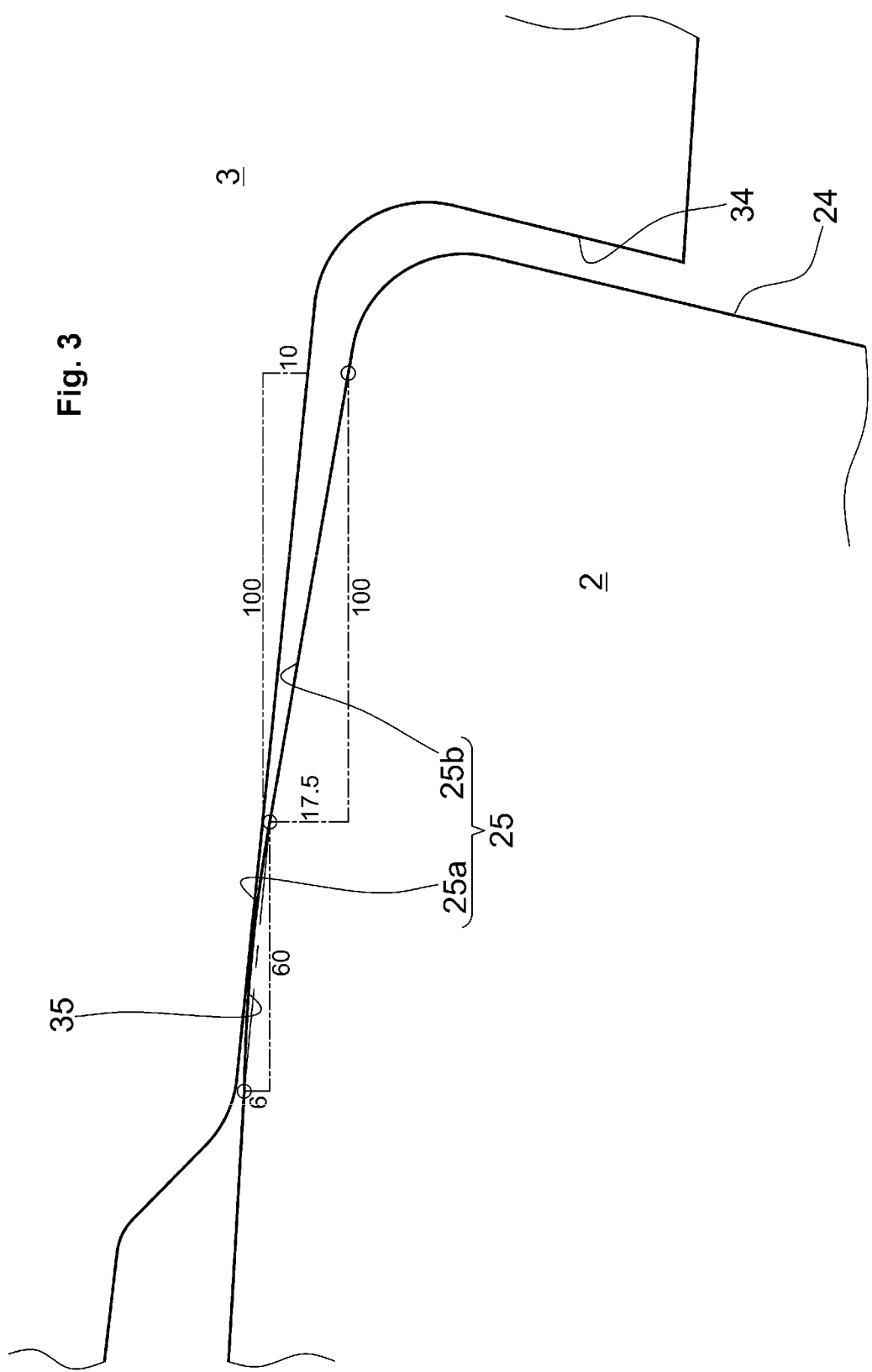

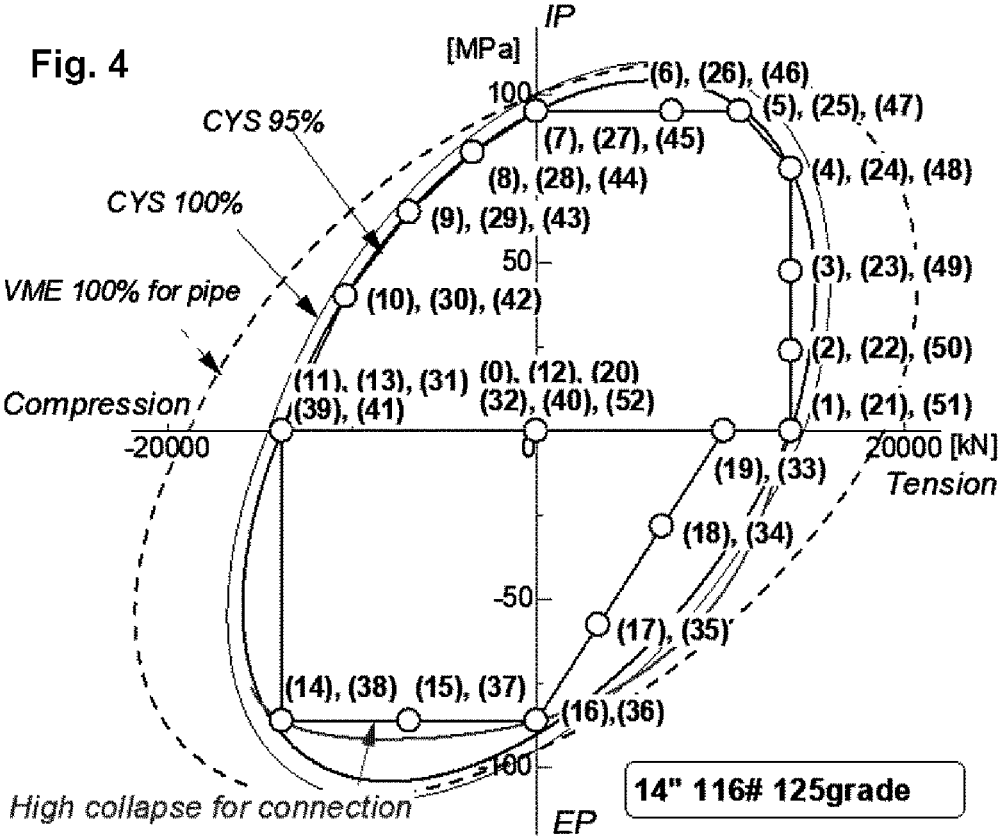

THREADED CONNECTION FOR PIPE

TECHNICAL FIELD

The present disclosure relates to a threaded connection for pipe used to connect steel pipes, for example.

BACKGROUND ART

In oil wells, natural-gas wells, etc. (hereinafter collectively referred to as "oil wells"), underground resources are mined using a casing system that forms a multi-run well wall and tubing positioned within the casing system to produce oil or gas. Such casing or tubing is composed of a large number of steel pipes connected in series, where a threaded connection for pipe is used to connect such pipes. A steel pipe used in an oil well is also referred to as oil-well pipe.

Threaded connections for pipe are generally categorized as integral type and coupling type. Integral threaded connections for pipe are disclosed, for example, in Patent Document 1 as well as in Patent Document 2, FIGS. 5 to 7, both listed below, and coupling-type threaded connections for pipe are disclosed, for example, in Patent Document 2, FIG. 4, as well as in Patent Document 3.

An integral connection directly connects oil-well pipes. Specifically, a female thread is provided on one end of each oil-well pipe, while a male thread is provided on the other end of each pipe; into the female thread of one oil-well pipe is screwed the male thread of another oil-well pipe such that the oil-well pipes are connected.

In the case of a coupling-type connection, oil-well pipes are connected using a tubular coupling. Specifically, a female thread is provided on each end of the coupling, while a male thread is provided on each end of each oil-well pipe. Then, one male thread of one oil-well pipe is screwed into one female thread of the coupling and one male thread of another oil-well pipe is screwed into the other female thread of the coupling such that the oil-well pipes are connected by means of the coupling. That is, a coupling-type connection directly connects a pair of pipes, one of which is an oil-well pipe while the other one is a coupling.

Generally, an end of an oil-well pipe on which a male thread is provided includes an element to be inserted into a female thread provided on an oil-well pipe or coupling, and thus is referred to as pin. An end of an oil-well pipe or coupling on which a female thread is provided includes an element for receiving a male thread provided on an end of an oil-well pipe, and thus is referred to as box.

In accordance with the latest standards for connections for oil-well pipe, such as API 5C5 RP CAL-IV 2017, the loads of tension, compression, internal pressure, and external pressure along the combined-load ellipses of Test Series A are larger than those for older standards, such as ISO-CAL IV 2002. Further, in recent years, deeper and deeper wells with higher temperatures and higher pressures have been developed, resulting in harsher and harsher environments in which threaded connections for oil-well pipe are used; particularly, improvements of performance against axial compressive loads (hereinafter also referred to as "compression resistance") are desired.

Meanwhile, a deep well has a complicated formation-pressure distribution with depth, which requires an increased number of casing runs; thus, a type of threaded connection is required which has a maximum outer diameter, i.e., a box outer diameter, that is substantially equal to the outer diameter of the pipe body of the oil-well pipe. A threaded connection with a box outer diameter that is substantially equal to the outer diameter of the pipe body of the oil-well pipe is sometimes referred to as flush-type threaded connection. Further, a threaded connection with a box outer diameter that is generally smaller than 108% of the outer diameter of the pipe body of the oil-well pipe is sometimes referred to as semi-flush-type threaded connection. Such a flush-type or semi-flush-type threaded connection is not only required to have high strength and sealability but is under strict size restrictions for its various portions in order to allow thread structures and seal structures to be positioned within a limited pipe-wall thickness.

For flush-type and semi-flush-type threaded connections with tight size restrictions, a connection design is often employed that includes intermediate shoulder surfaces in the middle of the connection as determined along the axial direction, with male and female threads each constituted by an inner thread and an outer thread positioned forward and rearward of the associated intermediate shoulder, i.e., two thread steps, as disclosed in Patent Document 1. A connection design with a two-step thread construction provides larger areas for critical cross sections.

Critical cross section (CCS) means a vertical cross section (i.e., cross section perpendicular to the pipe axis) of the connection where the stress generated when the connection is made up and upon application of a tensile load is at the maximum. When an excessive tensile load is applied, the connection is likely to fracture at a critical cross section or at a nearby location.

In a threaded connection for oil-well pipe, the transmission of a tensile load from the pin to the box is axially dispersed along the entire region of thread engagement. Thus, the cross section of the pin on which the entire tensile load acts is located further toward the pipe body of the pin than the region of thread engagement, while the cross section of the box on which the entire tensile load acts is located further toward the pipe body of the box than the region of thread engagement. That one of the cross sections on which the entire tensile load acts which has the smallest area represents the critical cross section. That is, when the connection is made up and the male and female threads are in engagement, the vertical cross section (i.e., cross section perpendicular to the pipe axis) of the box containing the position of the thread root of that female thread which corresponds to that end of the engagement which is located closer to the tip of the pin represents the box critical cross section (BCCS). When the connection is made up and the male and female threads are in engagement, the vertical cross section (i.e., cross section perpendicular to the pipe axis) of the pin containing the position of the thread root of that male thread which corresponds to that end of the engagement which is located closer to the pipe body of the pin represents the pin critical cross section (PCCS). The one of the box and pin critical cross sections that has the smaller area represents the critical cross section (CCS) of this particular threaded connection. The ratio of the area of the critical cross section to the cross-sectional area of the pipe body of the oil-well pipe is referred to as joint efficiency, which is a widely used indicator of the tensile strength of a connection for oil-well pipe relative to the tensile strength of the pipe body.

A threaded connection with a two-step thread construction, too, has such box and pin critical cross sections. In addition, a threaded connection with a two-step thread construction has another location with a small connection cross section for bearing a tensile load, located in a central portion of the connection as determined along the axial direction, as discussed above. That is, the threaded connection with a two-step thread construction has a section with no thread engagement in a central portion thereof along the axial direction. In this section with no thread engagement, the tensile load borne by the pin and box is axially transmitted without being increased or decreased. Thus, the pin cross section located within the section with no thread engagement and having the smallest area within that section represents a pin intermediate critical cross section (PICCS), while the box cross section located in the section with no thread engagement and having the smallest area within that section represents a box intermediate critical cross section (BICCS). To prevent a fracture in a central portion of the connection, it is preferable that the sum of the areas of the pin and box intermediate critical cross sections be larger than the area of the critical cross section (CCS) of the threaded connection.

PRIOR ART DOCUMENTS

Patent Documents

[Patent Document 1] JP 2018-536818 A (WO 2017/097700 A)
[Patent Document 2] JP Sho57(1982)-186690 A
[Patent Document 3] WO 2014-045973 A

SUMMARY OF THE INVENTION

Problems to be Solved by the Invention

The semi-flush-type integral threaded connection with a two-step thread construction disclosed by Patent Document 1 requires forming a two-step construction within the wall-thickness range of the hollow shell of an oil-well pipe, which results in a reduction in the strength of the connection compared with coupling-type threaded connections using a coupling having a larger outer diameter than the oil-well pipe, making it difficult to provide a sufficient strength for withstanding high compressive loads.

Generally, to improve compression performance, it is effective to increase the area of contact between the pin and box portions that bear compressive loads. That is, providing a sufficiently large radial contact width between intermediate shoulders that function as torque stops during make-up (i.e., radial width of contact portions) is expected to contribute to the improvement of compression performance.

However, if the contact width between the intermediate shoulder surfaces is increased, the pipe-wall thicknesses of each of the pin and box as measured at the thread sections and/or seal sections are sacrificed, which decreases sealability and also leads to a reduction in the sum of the areas of the pin intermediate critical cross section and box critical cross section, causing a reduction in the tensile strength of the threaded connection.

Further, while Patent Document 1 teaches that the intermediate shoulder surfaces of the threaded connection function as torque stops during make-up and make-up is completed with the pin tip (20) and box end shoulder (30) spaced apart from each other, Patent Document 1 is silent on the behavior of the made-up connection upon application of an axial compressive load.

Thus, in the conventional threaded connection of Patent Document 1, compressive loads must be borne by the contact between the intermediate shoulder surfaces (26, 28) only, which makes it difficult to significantly improve compression performance.

An object of the present disclosure is to provide a threaded connection for pipe with a two-step thread construction with further improved compression resistance.

Means for Solving the Problems

A threaded connection for pipe according to the present disclosure includes a tubular pin and a tubular box, the pin and the box adapted to be made up as the pin is screwed into the box.

The pin includes: a first male thread; a second male thread located further toward a tip than the first male thread and having a smaller diameter than the first male thread; a pin intermediate shoulder surface located between the first male thread and the second male thread; a pin end shoulder surface located at the tip of the pin; and a pin sealing surface located between the second male thread and the pin end shoulder surface.

The box includes: a first female thread adapted to be engaged by the first male thread when the connection is made up; a second female thread adapted to be engaged by the second male thread when the connection is made up; a box intermediate shoulder surface adapted to be in contact with the pin intermediate shoulder surface when the connection is made up; a box end shoulder surface corresponding to the pin end shoulder surface; and a box sealing surface located between the second female thread and the box end shoulder surface and adapted to be in contact with the pin sealing surface along an entire circumference when the connection is made up.

In the threaded connection for pipe according to the present disclosure, an axial distance between the box intermediate shoulder surface and the box end shoulder surface of the box before make-up, $L_B$, is larger than an axial distance between the pin intermediate shoulder surface and the pin end shoulder surface of the pin before make-up, $L_P$. Thus, during make-up and at a time point at which the pin and box intermediate shoulder surfaces start to be in contact, the pin and box end shoulder surfaces are not in contact. That is, the pin and box intermediate shoulder surfaces function as torque stops. On the other hand, upon completion of make-up, the pin and box end shoulder surfaces are spaced apart from each other. Alternatively, the connection may be such that, due to the make-up, the pin tip is drawn in the direction of the tip relative to the pin intermediate shoulder surface and the pin end shoulder surface elastically deforms in the direction of the pin tip such that, upon completion of make-up, the pin and box end shoulder surfaces are in such light contact with each other that, practically, they do not function as torque stops.

Further, in the threaded connection for pipe according to the present disclosure, a difference between the axial distances, $(L_B-L_P)$, is such that, when the connection is made up and upon application of an axial compressive load, the pin end shoulder surface starts to be in contact with the box end shoulder surface before the threaded connection for pipe yields. Thus, upon application of an axial compressive load, the pin and box end shoulder surfaces are in contact such that part of the axial compressive load can be borne by the pin and box end shoulder surfaces, and thus the connection structure as a hole can provide a required yield compression strength. Further, the contact between the end shoulder surfaces restricts the axial amount of shifting of the pin sealing surface relative to the box sealing surface and thus reduces damage accumulated in and near the pin and box sealing surfaces upon application of a large compressive load, such that the internal-pressure sealability after the compressive load disappears is substantially the same as before.

Preferably, the axial distances $L_B$ and $L_P$ are such that, when the connection is made up and no axial compressive load is applied, a clearance is formed between the pin end shoulder surface and the box end shoulder surface. In such implementations, the pin and box end shoulder surfaces do not function as torque shoulders, but function as "pseudo-shoulders" that bear part of an axial compressive load.

More preferably, the second male thread and the second female thread are constructed such that, when the connection is made up and no axial compressive load is applied, a clearance is formed between stab flanks of the second male thread and the second female thread, and the clearance between the stab flanks is of such a size that, as the applied axial compressive load gradually increases, the stab flanks first start to be in contact and then the pin end shoulder surface and the box end shoulder surface start to be in contact. In such implementations, part of the axial compressive load can be borne by the second male and female threads, thereby further improving compression resistance. Further, the end shoulder surfaces start to be in contact after the stab flanks of the second male and female threads start to be in contact, thereby reducing the magnitude of compressive load borne by the pin and box end shoulder surfaces. Thus, even if the area of contact between the end shoulder surfaces is small, the connection as a whole can exhibit good compression resistance.

Preferably, a slope of a straight line connecting ends, as determined along an axial direction, of the pin sealing surface is not smaller than 5% and not larger than 25%. A slope larger than 25% makes it difficult to provide a sufficient amount of seal interference. A slope smaller than 5% increases the risk of galling during make-up. More preferably, the slope may be not smaller than 10% and not larger than 17%. The box sealing surface may have a similar slope to that of the pin sealing surface; preferably, the slope of the box sealing surface is equal to the slope of the pin sealing surface. Each of the taper generatrices of the pin and box sealing surfaces may be a straight line, may be slightly curved to protrude, or may locally include a convex curved line and a straight line.

As used herein, "upon completion of make-up" means a point of time where, after the pin has been made up on the box, neither an axial load nor an internal/external pressure is being applied to the threaded connection. On the other hand, "when the connection is made up" means that the pin and box are made up, regardless of whether at least one of an axial load, internal pressure and external pressure is being applied. "When the connection is made up" applies if the pin and box are made up, even after application of an axial load and internal/external pressure within a range that does not result in a fracture of the threaded connection nor a loss of the contact surface pressure between the sealing surfaces of the pin and box, more preferably within the elastic range.

The axial distances $L_P$ and $L_B$ are only required to give a substantially unique difference ($L_B$—$L_P$); as such, it is sufficient to use unified standards for measurement, and the axial distances $L_B$ and $L_P$ themselves need not be exactly and individually defined. For example, the axial distance $L_B$ may be the axial distance between the radially inner edge of the box intermediate shoulder surface and the radially inner edge of the box end shoulder surface; in such implementations, the axial distance $L_P$ is the axial distance between the location on the pin intermediate shoulder surface that corresponds to the radially inner edge of the box intermediate shoulder surface (i.e., location that contacts the radially inner edge of the box intermediate shoulder surface) and the location on the pin intermediate shoulder surface that corresponds to the radially inner edge of the box end shoulder surface (i.e., location that contacts the radially inner edge of the box end shoulder surface). Alternatively, the axial distance $L_P$ may be the axial distance between the radially outer edge of the pin intermediate shoulder surface and the radially outer edge of the pin end shoulder surface; in such implementations, the axial distance $L_B$ is the axial distance between the location on the box intermediate shoulder surface that corresponds to the radially outer edge of the pin intermediate shoulder surface (i.e., location that contacts the radially outer edge of the pin intermediate shoulder surface) and the location on the box intermediate shoulder surface that corresponds to the radially outer edge of the pin end shoulder surface (i.e., location that contacts the radially outer edge of the pin end shoulder surface).

Effects of the Invention

According to the present disclosure, upon completion of make-up, the pin and box end shoulder surfaces are not in contact, or, even if they are in contact, the contact pressure between the pin and box end shoulder surfaces is smaller than the contact pressure between the pin and box intermediate shoulder surfaces. Thus, upon completion of make-up of the pin and box, large compressive stress is not generated in the pin's tip with the pin end shoulder surface and nearby portions, thereby providing a margin for the axial compressive load that can be borne by the pin end shoulder surface. Further, when the connection is made up and upon application of a certain magnitude of axial compressive load to the threaded connection for pipe, the pin end shoulder surface contacts the box end shoulder surface to bear part of the axial compressive load, thereby preventing excessive compressive stress from acting on the intermediate shoulder surfaces functioning as torque shoulders, and thus improving compression resistance.

BRIEF DESCRIPTION OF THE DRAWINGS

FIG. 2C is an enlarged view of the pin's tip and nearby portions as found when the connection is made up and upon application of a large compressive load (although not so large as to cause the intermediate shoulder surfaces and threads to yield).

FIG. 3 is an enlarged view of the pin's sealing surface and nearby portions of a threaded connection for oil-well pipe according to another embodiment.

FIG. 4 illustrates the load paths under the combined-load conditions used for the analysis.

EMBODIMENTS FOR CARRYING OUT THE INVENTION

Figure 1:
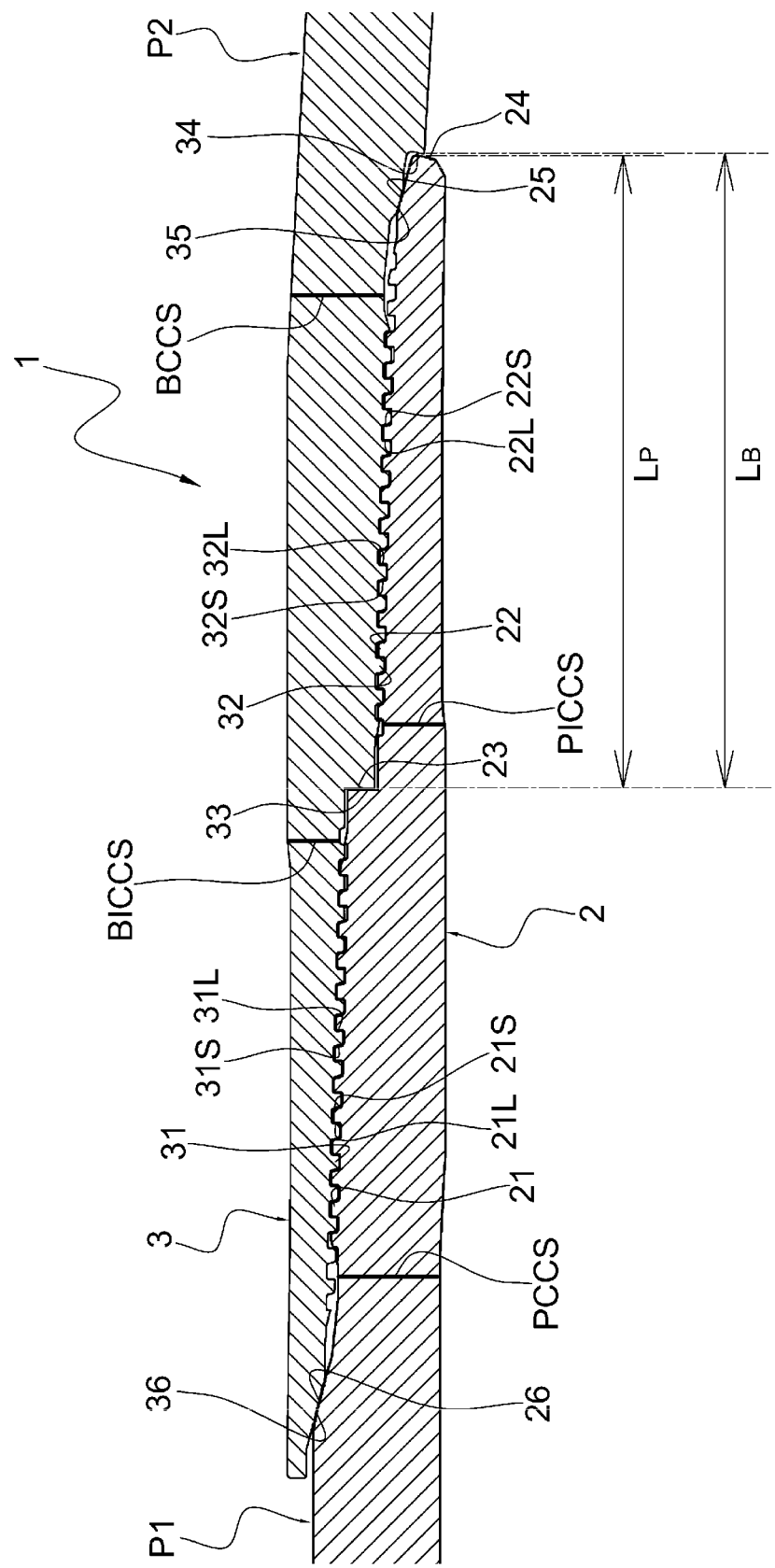
FIG. 1 is a longitudinal cross-sectional view of a threaded connection for oil-well pipe according to an embodiment as made up.

As illustrated in FIG. 1, a threaded connection 1 for pipe according to the present embodiment includes a tubular pin 2 and a tubular box 3. The pin 2 and box 3 are made up as the pin 2 is screwed into the box 3. The pin 2 is located at a pipe end of a first pipe P1, while the box 3 is located at a pipe end of a second pipe P2. The first pipe P1 may be a long pipe, such as oil-well pipe. The second pipe is preferably a long pipe such as oil-well pipe, although it may be a coupling for connecting long pipes. That is, the threaded connection for pipe 1 according to the present embodiment is preferably an integral threaded connection for pipe. The oil-well pipe and coupling are typically made of steel; alternatively they may be made of a metal such as stainless steel or nickel-based alloy.

The pin 2 may be provided at one swaged end of the first oil-well pipe P1. The box 3 may be provided at one expanded end of the second oil-well pipe P2. Preferably, a pin 2 may be provided at one end of each of the oil-well pipes P1 and P2, while a box 3 may be provided at another end of each pipe. More particularly, the first oil-well pipe P1 is produced by preparing a hollow shell constituted by a long pipe, swaging one end thereof, and then machining the outer periphery of the swaged end to form components of the pin 2. The second oil-well pipe P2 is produced by preparing a hollow shell constituted by a long pipe, expanding one end thereof, and then machining the inner periphery of the expanded end to form components of the box 3. This provides sufficient wall thicknesses for the pin 2 and box 3 of a semi-flush-type integral threaded connection.

As used herein, "pipe body" means the portions of an oil-well pipe P1, P2 other than the pin 2 and box 3 and that have been neither swaged nor expanded. "Toward the pipe end of the pin 2" indicates the direction from the pipe body of the pin 2 toward the pipe end of the pin 2, which is sometimes also referred to as "direction of the tip". "Toward the pipe body of the pin 2" indicates the direction from the pipe end of the pin 2 toward the pipe body of the pin 2, which is sometimes also referred to as "direction of the basement". "Toward the open end of the box 3" indicates the direction from the pipe body of the box 3 toward the open end of the box 3.

The pin 2 includes: a first male thread 21: a second male thread 22 located further toward the pipe end of the pin 2 than the first male thread 21 is and having a smaller diameter than the first male thread 21; a pin intermediate shoulder surface 23 located between the first and second male threads 21 and 22; a pin end shoulder surface 24 located at the pipe end of the pin 2; and a pin sealing surface 25 located between the second male thread 22 and pin end shoulder surface 24. The first and second male threads 21 and 22 are spaced apart from each other in the axial direction, and the pin intermediate shoulder surface 23 may be located therebetween.

Preferably, each of the first and second male threads 21 and 22 is constituted by a tapered thread. Preferably, the first and second male threads 21 and 22 have the same thread taper angle and the same thread pitch. Preferably, the taper generatrix of the tapered thread constituting the second male thread 22 is located radially inward of the taper generatrix of the tapered thread constituting the first male thread 21. The pin intermediate shoulder surface 23 may be constituted by the side of a stepped portion formed by a portion of the outer periphery of the pin located between the first and second male threads 21 and 22. The pin intermediate shoulder surface 23 faces toward the pipe end of the pin 2. Each of the first and second male threads 21 and 22 may be a trapezoidal thread, an API round thread, an API buttress thread, or a wedge thread, for example.

The box 3 includes: a first female thread 31 to be engaged by the first male thread 21 upon completion of make-up; a second female thread 32 to be engaged by the second male thread 22 upon completion of make-up; a box intermediate shoulder surface 33 to be in contact with the pin intermediate shoulder surface 23 upon completion of make-up; a box end shoulder surface 34 provided to correspond to the pin end shoulder surface 24; and a box sealing surface 35 located between the second female thread 32 and box end shoulder surface 34 to be in contact with the pin inner sealing surface 25 along the entire circumference upon completion of make-up. The pin and box sealing surfaces 25 and 35 may function as an internal-pressure seal that exhibits sealability mainly against internal pressures. Preferably, the box 3 may further include an external-pressure box sealing surface 36 located further toward the open end of the box 3 than the first female thread 31, whereas the pin 2 may further include an external-pressure pin sealing surface 26 to be in contact with the external-pressure box sealing surface 36 along the entire circumference upon completion of make-up. The external-pressure pin sealing surface 26 is located further toward the basement of the pin than the first male thread 21.

The first and second female threads 31 and 32 are spaced apart from each other in the axial direction, and the box intermediate shoulder 33 may be located therebetween. Preferably, each of the first and second female threads 31 and 32 is constituted by a tapered thread complementary to the corresponding one of the first and second male threads 21 and 22. The box intermediate shoulder surface 33 may be constituted by the side of a stepped portion formed by a portion of the inner periphery of the box 3 located between the first and second female threads 31 and 32. The box intermediate shoulder surface 33 faces toward the open end of the box 3 and is to face the pin intermediate shoulder surface 23. The box intermediate shoulder surface 33 is in contact with the pin intermediate shoulder surface 23 at least upon completion of make-up, and the intermediate shoulder surfaces 23 and 33 function as torque shoulders that exhibit torque performance. Each of the first and second female threads 31 and 32 may be a trapezoidal thread, an API round thread, an API buttress thread, or a wedge thread, for example, that is complementary to the corresponding one of the first and second male threads 21 and 22.

Preferably, each of the thread crest and root surfaces of the threads 21, 22, 31 and 32 has a shape that appears in a longitudinal cross section as a straight line extending parallel to the pipe axis.

Preferably, upon completion of make-up of the pin 2 and box 3, the load flanks 21L and 31L of the first male and female threads 21 and 31 are in contact and the load flanks 22L and 32L of the second male and female threads 22 and 32 are in contact, whereas a clearance is formed between the stab flanks 21S and 31S of the first male and female threads 21 and 31 and a clearance is formed between the stab flanks 22S and 32S of the second male and female threads 22 and 32.

Preferably, the size of the clearance formed between the stab flanks 21S and 31S of the first male and female threads 21 and 31 is uniform along the entire axial range of engagement between these threads 21 and 31; alternatively, a larger clearance may be present within a small portion of the axial range. Preferably, the size of the clearance formed between the stab flanks 22S and 32S of the second male and female threads 22 and 32 is uniform along the entire axial range of engagement between these threads 22 and 32; alternatively, a larger clearance may be present within a small portion of the axial range. Preferably, the size of the clearance formed between the stab flanks 21S and 31S is equal to the size of the clearance formed between the stab flanks 22S and 32S.

Preferably, the clearance formed between the stab flanks 21S and 31S of the first male and female threads 21 and 31 upon completion of make-up is of such a size that, upon application of a predetermined axial compressive load smaller than the yield compressive load of the pin 2 and box 3, the pin 2 and box 3 deform in such a manner that the stab flanks 21S and 31S start to be in contact to bear part of the axial compressive load. The stab flanks 21S and 31S may contact in various manners at the time when they start to be in contact; contact may start at a predetermined location on the first male and female threads 21 and 31 as determined along the pipe-axis direction and, as the axial compressive load increases, the area of contact between the stab flanks 21S and 31S may gradually spread, or the entire stab flanks 21S and 31S may start to be in contact simultaneously. The dimension of the clearance formed between the stab flanks 21S and 31S upon completion of make-up as measured in the pipe-axis direction may be not larger than 0.15 mm, for example. To prevent galling during make-up, it is preferable that the dimension of the clearance be not smaller than 0.06 mm.

Preferably, the clearance formed between the stab flanks 22S and 32S of the second male and female threads 22 and 32 upon completion of make-up is of such a size that, upon application of a predetermined axial compressive load smaller than the yield compressive load of the pin 2 and box 3, the pin 2 and box 3 deform in such a manner that the stab flanks 22S and 32S start to be in contact to bear part of the axial compressive load. The stab flanks 22S and 32S may contact in various manners at the time when they start to be in contact; contact may start at a predetermined location on the second male and female threads 22 and 32 as determined along the pipe-axis direction and, as the axial compressive load increases, the area of contact between the stab flanks 22S and 32S may gradually spread, or the entire stab flanks 22S and 32S may start to be in contact simultaneously. The axial compressive load at which the stab flanks 22S and 32S start to be in contact may be different from the axial compressive load at which the stab flanks 21S and 31S start to be in contact. The dimension of the clearance formed between the stab flanks 22S and 32S upon completion of make-up as measured in the pipe-axis direction may be not larger than 0.15 mm, for example. To prevent galling during make-up, it is preferable that the dimension of the clearance be not smaller than 0.06 mm.

Figure 2A:
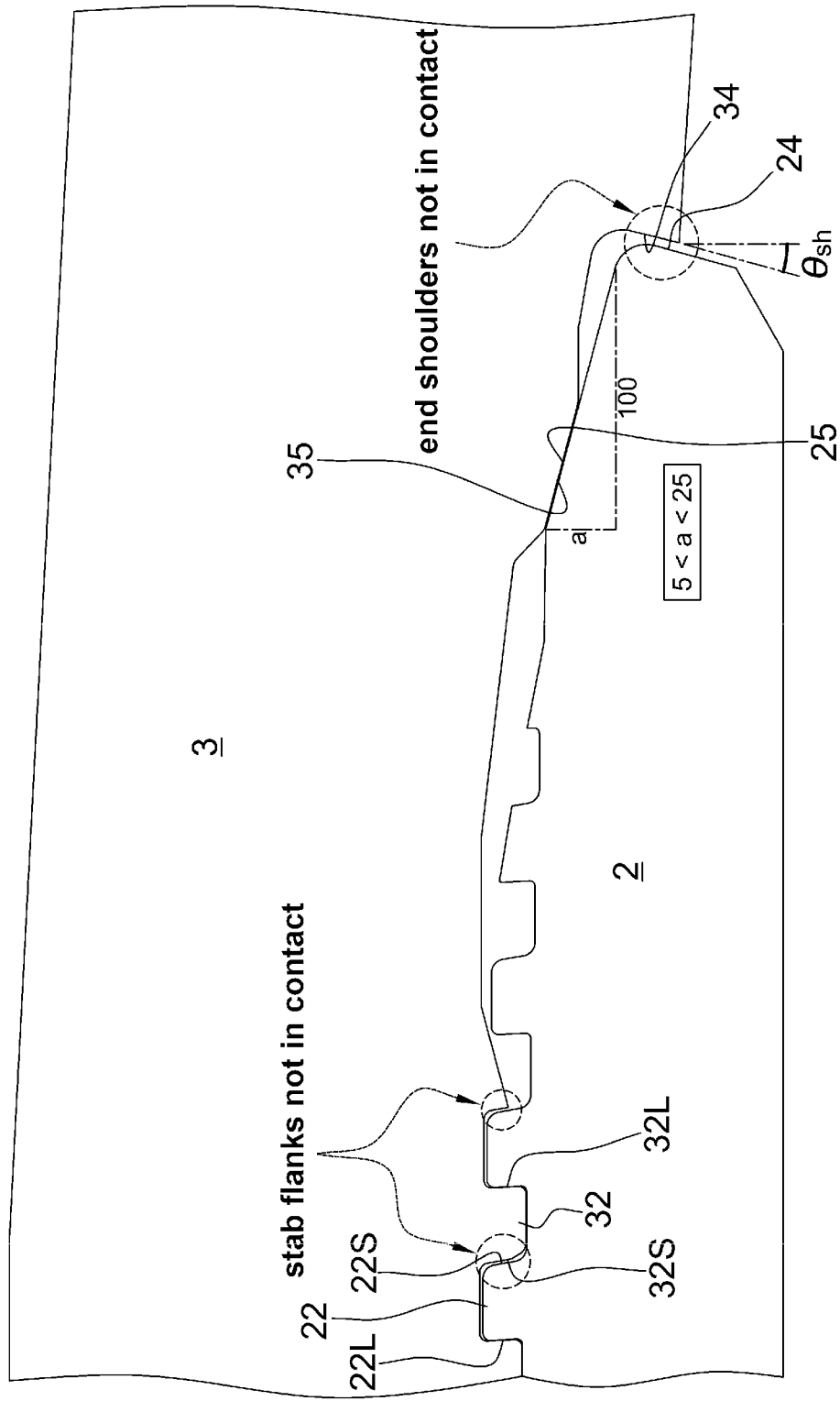
FIG. 2A is an enlarged view of the pin's tip and nearby portions as found when the connection is made up and no compressive load is applied.

The box end shoulder surface 34 is constituted by a taper surface inclined such that the radially inner edge is located further toward the open end of the box 3 than the radially outer edge. The pin end shoulder surface 24 may be in contact with the box end shoulder surface 34 upon completion of make-up, or, as shown in FIG. 2A, a clearance may be formed between the pin end shoulder surface and the box end shoulder surface 34 upon completion of make-up. At least upon application of a predetermined axial compressive load smaller than the yield compressive load of the threaded connection, the resulting elastic deformation of the pin 2 and box 3 causes the end shoulder surfaces 24 and 34 of the pin 2 and box 3 to contact each other to bear part of the axial compressive load.

The radial width of the area of contact between the pin and box end shoulder surfaces 24 and 34 (see FIG. 2C) may be smaller than 1 mm. Reducing the contact width between the end shoulder surfaces 24 and 34 makes it easier to provide sufficient wall thicknesses for other portions. As used herein, area of contact between the end shoulder surfaces 24 and 34 of the pin 2 and box 3 means the area of contact as found when the pin 2 and box 3 have radially deformed due to the amount of seal interference, and is smaller than the overlap between the end shoulder surfaces 24 and 34 of the pin 2 and box 3 before make-up, i.e., before deformation, as viewed in the pipe-axis direction.

Figure 2B:
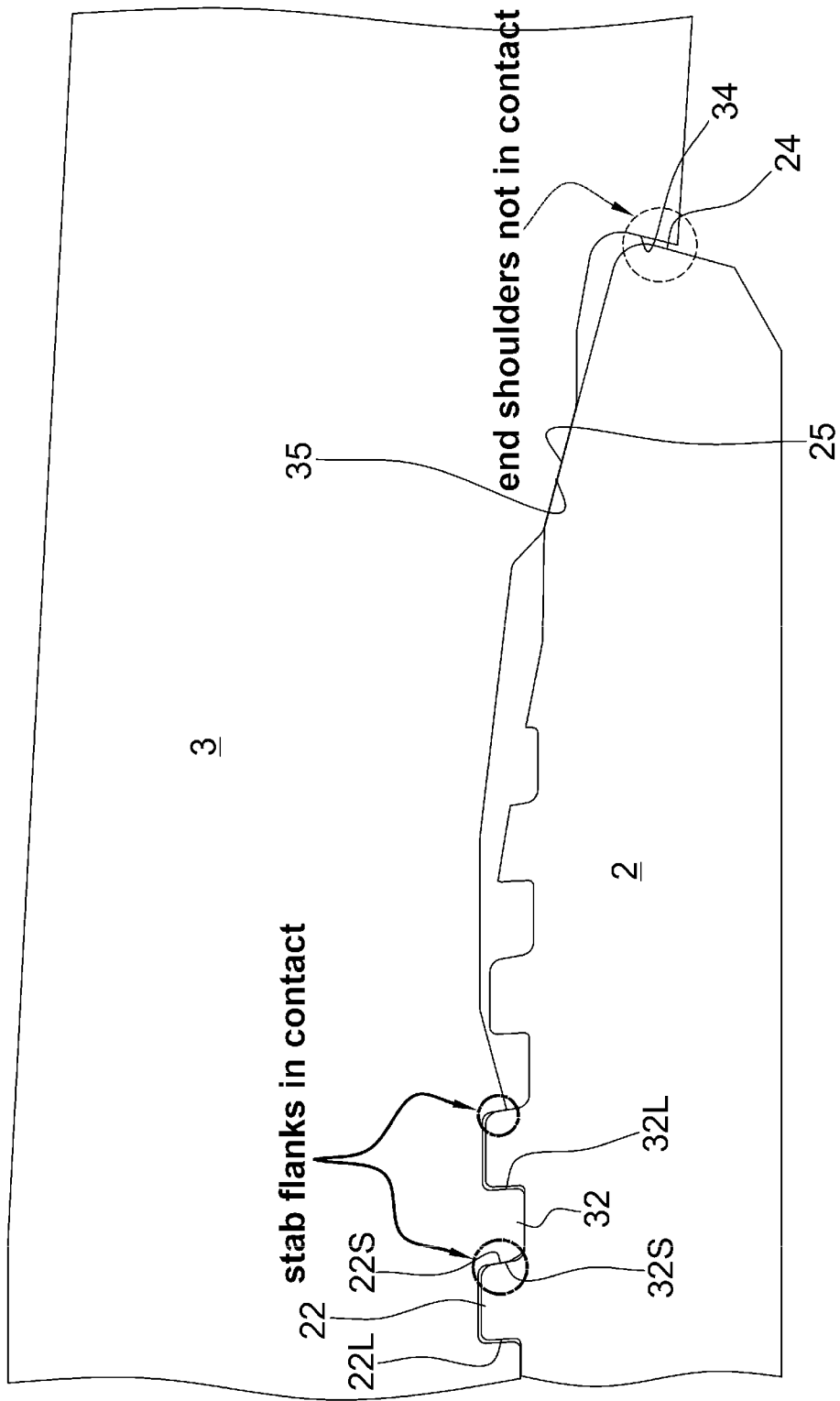
FIG. 2B is an enlarged view of the pin's tip and nearby portions as found when the connection is made up and upon application of a certain magnitude of compressive load.

More preferably, the clearance between the stab flanks 22S and 32S and the clearance between the end shoulder surfaces 24 and 34 upon completion of make-up may be of such sizes that, first, the stab flanks 22S and 32S of the second male and female threads 22 and 32 start to be in contact, as shown in FIG. 2B, and, as the applied compressive load further increases, the end shoulder surfaces 24 and 34 start to be in contact, as shown in FIG. 2C. In such implementations, even if the contact width between the end shoulder surfaces 24 and 34 is small, plastic strain in and near the end shoulder surfaces 24 and 34 due to the axial compressive load applied is relatively small because the compressive load borne by the end shoulder surfaces 24 and 34 is relatively small. In addition, part of the compressive load acting on the stab flank 22S of the second male thread 22 of the pin 2 is expected to cause the pin tip to expand to flare out, and thus is expected to help maintain the contact pressure between the internal-pressure sealing surfaces 25 and 35.

Alternatively, the connection may be constructed such that, first, the end shoulder surfaces 24 and 34 start to be in contact and, as the applied compressive load further increases, the stab flanks 22S and 32S start to be in contact. This further ensures that the end shoulder surfaces 24 and 34 contact each other, thereby reducing diameter-reducing deformation in and near the pin tip.

The end shoulder angle $\theta_{sh}$ of the box end shoulder surface 34 is preferably larger than 5°, and more preferably larger than 10°. Further, the end shoulder angle $\theta_{sh}$ is preferably not larger than 45°, and more preferably not larger than 25°. It is preferable that the end shoulder angle of the pin end shoulder surface 24 be equal to the end shoulder angle $\theta_{sh}$ of the box end shoulder surface 34.

Although each of the intermediate shoulder surfaces 23 and 33 of the pin 2 and box 3 is constituted by a flat surface perpendicular to the pipe axis, each of them may be constituted by a taper surface inclined such that the radially outer edge is located further toward the pipe end of the pin 2 than the radially inner edge.

Each of the sealing surfaces 25, 35, 26 and 36 may have any longitudinal cross-sectional shape; in the threaded connection 1 shown in FIGS. 1 to 2, each sealing surface is constituted by a taper surface that appears as an inclined straight line in a longitudinal cross section. Alternatively, one of each pair of sealing surfaces that contact each other may be constituted by a convex curved surface, or each sealing surface of each pair may be constituted by a convex curved surface. In any case, the sealing surfaces are constructed in such a manner that the amount of seal interference increases as the pin 2 is pushed into the interior of the box 3. The slope of the straight line connecting the two ends, as determined along the axial direction, of each sealing surface is preferably not smaller than 5% (or 10% as represented as a taper ratio), or more preferably 10% (or 20% as represented as a taper ratio). Further, the slope of the straight line connecting the two ends, as determined along the axial direction, of each sealing surface is preferably not larger than 25% (or 50% as represented as a taper ratio), and more preferably not larger than 17% (or 34% as represented as a taper ratio).

In the embodiment shown in FIG. 3, the box sealing surface 35 is constituted by a taper surface that appears as an inclined straight line in a longitudinal cross section, whereas the pin sealing surface 25 is constituted by a taper surface 25b that appears as an inclined straight line in a longitudinal cross section and an convex curved surface 25a whose central portion, as determined along the axial direction, protrudes toward the box sealing surface 35. The taper surface 25b is smoothly contiguous to that end of the convex curved surface 25a which is closer to the tip. In the present embodiment, the pin sealing surface 25 is constructed such that the convex curved surface 25a functions as a seal point that experiences strong pressure contact with the box sealing surface 35 during make-up. The present embodiment ensures that the seal point of the pin sealing surface 25 is positioned far away from the pin end shoulder 24, thus reducing the effect of the stress produced in the pin end shoulder surface 24 upon application of a large axial compressive load on the seal point and nearby portions of the pin sealing surface 25.

Further, FIG. 3 is also presented as an exemplary illustration of a pin sealing surface 25 and a box sealing surface 35 that are gently tapered. In the implementation shown, the slope of the box sealing surface 35 relative to the pipe axis is 10% (or 20% as represented as a taper ratio); the slope of the straight line connecting the two ends, as determined along the axial direction, of the convex curved surface 25a of the pin sealing surface 25 is 10%, i.e., equal to the slope of the box sealing surface 35; the slope of the taper surface 25b of the pin sealing surface 25 is 17.5% (or 35% as represented as a taper ratio); and the slope of the straight line connecting the two ends, as determined along the axial direction, of the entire pin sealing surface 25 is (6+17.5)/(100+60)≈15%. Thus, as the pin and box sealing surfaces 25 and 35 are gently tapered, the radial widths of the pin and box end shoulder surfaces 24 and 34 are increased, thereby further improving compression resistance. Further, as these end shoulders 24 and 34 can bear larger compressive loads, a design margin is provided for the intermediate shoulders 23 and 33 and threads 21, 31, 22 and 32, making improvements possible for improving functions other than compression resistance.

In the threaded connection for pipe 1 according to the present embodiment, the intermediate shoulder surface 23 of the pin 2 contacts the intermediate shoulder surface 33 of the box 3 as the pin 2 is tightened into the box 3. The make-up torque at this time is sometimes referred to as shouldering torque. When the pin 2 is further tightened into the box 3, the sliding contact between the intermediate shoulder surfaces 23 and 33 causes a rapid increase in make-up torque. Thus, the intermediate shoulder surfaces 23 and 33 function as torque shoulders. The intermediate shoulder surfaces 23 and 33 or nearby portions and/or male threads 21 and 22 and/or female threads 31 and 32 are fractured when tightening torque exceeds the respective yield torques, and tightening torque does not increase anymore even when the amount of tightening rotation is increased. Consequently, the make-up should be completed before tightening torque reaches a yield torque.

In the threaded connection 1, upon completion of make-up, the load flanks of the male threads 21 and 22 and female threads 31 and 32 are in contact, while small clearances are formed between the stab flanks of the male threads 21 and 22 and female threads 31 and 32 and, in addition, a small clearance is formed between the end shoulder surfaces 24 and 34.

As the axial compressive load applied to the threaded connection, as made up gradually increases, the compressive strain caused by the compressive load slightly axially compresses portions of the pin 2 closer to the pipe body than the pin intermediate shoulder surface 23 is and portions of the box 3 closer to the pipe body than the box intermediate shoulder surface 33. When the compressive load increases to a certain magnitude, the stab flanks 22S and 32S of the second male and female threads 22 and 32 start to be in contact before the end shoulder surfaces 24 and 34 start to be in contact, as shown in FIG. 2B; from then on, these stab flanks 22S and 32S also bear part of the compressive load. It is not necessary that the entire helices of the stab flanks 22S and 32S be in contact, and it is sufficient that some portions of the stab flanks 22S and 32S, as determined along the axial and circumferential directions, start to be in contact.

When the compressive load further increases, the end shoulder surfaces 24 and 34 start to be in contact before the yield compressive load is reached, such that part of the compressive load is borne by the end shoulder surfaces 24 and 34 and the relative amount of shifting between the pin and box sealing surfaces 25 and 35 caused by the compressive load is restricted. If the axial amount of shifting of the pin sealing surface 25 relative to the box sealing surface 35 were large, the taper shape of these sealing surfaces 25 and 35 would cause large pressures on the pin and box sealing surfaces 25 and 35 and nearby portions, resulting in accumulation of damage; then, even upon removal of the compressive load, the resulting elastic recovery would not provide the initial seal contact pressure: particularly, the internal-pressure sealability would decrease. In the threaded connection 1 of the present embodiment, the relative amount of shifting between the pin and box sealing surfaces 25 and 35 caused by a compressive load is restricted, thus reducing damage accumulated in and near the pin and box sealing surfaces 25 and 35; thus, the internal-pressure sealability after the compressive load disappears is substantially the same as before.

The present disclosure may not only be applied to integral threaded connections, but also to coupling-type connections. Otherwise, the present disclosure is not limited to the above-illustrated embodiment, and various modifications are possible within the scope of technical ideas of the present disclosure.

EXAMPLES

To verify the effects of the threaded connection 1 for oil-well pipe according to the present embodiment, simulations were conducted using numerical analysis by the elasto-plastic finite element method for inventive examples in which the end shoulders 24 and 34 are not in contact upon application of an axial compressive load and for comparative examples in which the end shoulders do not contact, to evaluate the internal-pressure sealability of each example.

The internal-pressure sealability was evaluated by successively applying the combined loads for points (1) to (52), which traced combined-load ellipses simulating Test Series A in accordance with API 5C5 CAL IV from the year 2017, shown in FIG. 4. In the drawing, "Compression" means compressive load; "Tension" means tensile load; "IP" means internal pressure; "EP" means external pressure; "VME 100% for pipe" indicates the yield curve of the pipe body of the oil-well pipe; "CYS" (which stands for connection yield strength) means the strength of the threaded connection; "CYS 100%" indicates the yield curve of the threaded connection; "CYS 95%" indicates the yield curve for 95% of the 100% CYS; and "High collapse for connection" indicates a collapse curve resulting from an external pressure on the threaded connection. The curve for "CYS 100%" was obtained by multiplying the axial force (compression or tension) indicated by "VMA 100% for pipe" by the joint efficiency JE.

Figure 5:
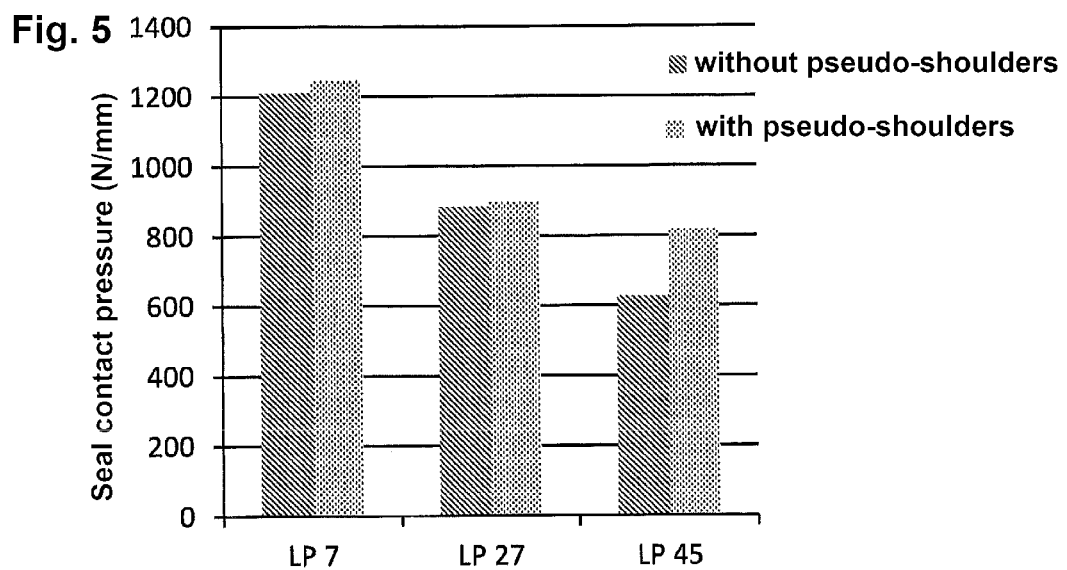
FIG. 5 is a graph comparing the seal contact pressures for the three load points where a simple internal pressure is applied.

FIG. 5 shows the seal contact force between the pin and box sealing surfaces 25 and 35 for comparing values for three load points (7), (27) and (45) upon application of a simple internal pressure. The inventive examples had pseudo-shoulders, whereas the comparative examples had no pseudo-shoulders.

LP7 indicates the seal contact force for load point (7), which represents the first application of a simple internal pressure along the repeated combined-load path for (1) to (52); LP27 indicates the seal contact force for load points (27), which represents the second application of a simple internal pressure; and LP45 indicates the seal contact force for load point (45), which represents the third application of a simple internal pressure.

As will be apparent from the drawing, seal contact force decreased more significantly for the examples with no pseudo-shoulders than those with pseudo-shoulders. This verifies that the present disclosure reduces decreases in internal-pressure sealability after application of repeated combined loads.

EXPLANATION OF CHARACTERS

1: threaded connection for pipe
2: pin; 21: first male thread; 22: second male thread
23: intermediate shoulder surface; 24: end shoulder surface; 25: pin sealing surface
3: box; 31: first female thread; 32: second female thread
33: intermediate shoulder surface; 34: end shoulder surface; 35: box sealing surface

The invention claimed is:

1. A threaded connection for pipe including a tubular pin and a tubular box, the pin and the box adapted to be made up as the pin is screwed into the box, wherein:
the pin includes: a first male thread; a second male thread located further toward a tip than the first male thread and having a smaller diameter than the first male thread; a pin intermediate shoulder surface located between the first male thread and the second male thread; a pin end shoulder surface located at the tip of the pin; and a pin sealing surface located between the second male thread and the pin end shoulder surface;
the box includes: a first female thread adapted to be engaged by the first male thread when the connection is made up; a second female thread adapted to be engaged by the second male thread when the connection is made up; a box intermediate shoulder surface adapted to be in contact with the pin intermediate shoulder surface when the connection is made up; a box end shoulder surface corresponding to the pin end shoulder surface; and a box sealing surface located between the second female thread and the box end shoulder surface and adapted to be in contact with the pin sealing surface along an entire circumference when the connection is made up;
an axial distance between the box intermediate shoulder surface and the box end shoulder surface of the box before make-up, $L_B$, is larger than an axial distance between the pin intermediate shoulder surface and the pin end shoulder surface of the pin before make-up, $L_P$;
a difference between the axial distances, $(L_B-L_P)$, is such that, when the connection is made up and upon application of an axial compressive load, the pin end shoulder surface starts to be in contact with the box end shoulder surface before the threaded connection for pipe yields;
wherein the axial distances $L_B$ and $L_P$ are such that, when the connection is made up and no axial compressive load is applied, a clearance is formed between the pin end shoulder surface and the box end shoulder surface; and
wherein each of the intermediate shoulder surfaces of the pin and box is constituted by a single flat surface perpendicular to the pipe axis.

2. The threaded connection for pipe according to claim 1, wherein a slope of a straight line connecting ends, as determined along an axial direction, of the pin sealing surface is larger than 5% and smaller than 25%.

3. A threaded connection for pipe including a tubular pin and a tubular box, the pin and the box adapted to be made up as the pin is screwed into the box, wherein:
the pin includes: a first male thread; a second male thread located further toward a tip than the first male thread and having a smaller diameter than the first male thread; a pin intermediate shoulder surface located between the first male thread and the second male thread; a pin end shoulder surface located at the tip of the pin; and a pin sealing surface located between the second male thread and the pin end shoulder surface;
the box includes: a first female thread adapted to be engaged by the first male thread when the connection is made up; a second female thread adapted to be engaged by the second male thread when the connection is made up; a box intermediate shoulder surface adapted to be in contact with the pin intermediate shoulder surface when the connection is made up; a box end shoulder surface corresponding to the pin end shoulder surface; and a box sealing surface located between the second female thread and the box end shoulder surface and adapted to be in contact with the pin sealing surface along an entire circumference when the connection is made up;
an axial distance between the box intermediate shoulder surface and the box end shoulder surface of the box before make-up, $L_B$, is larger than an axial distance between the pin intermediate shoulder surface and the pin end shoulder surface of the pin before make-up, $L_P$;
a difference between the axial distances, $(L_B-L_P)$, is such that, when the connection is made up and upon application of an axial compressive load, the pin end shoulder surface starts to be in contact with the box end shoulder surface before the threaded connection for pipe yields;
wherein the axial distances $L_B$ and $L_P$ are such that, when the connection is made up and no axial compressive load is applied, a clearance is formed between the pin end shoulder surface and the box end shoulder surface; and
wherein each of the intermediate shoulder surfaces of the pin and box is constituted by a flat surface perpendicular to the pipe axis; and
further wherein:
the second male thread and the second female thread are constructed such that, when the connection is made up and no axial compressive load is applied, a clearance is formed between stab flanks of the second male thread and the second female thread; and the clearance between the stab flanks is of such a size that, as the applied axial compressive load gradually increases, the stab flanks first start to be in contact and then the pin end shoulder surface and the box end shoulder surface start to be in contact.

4. The threaded connection for pipe according to claim 3, wherein a slope of a straight line connecting ends, as determined along an axial direction, of the pin sealing surface is larger than 5% and smaller than 25%.

5. A threaded connection for pipe including a tubular pin and a tubular box, the pin and the box adapted to be made up as the pin is screwed into the box, wherein:

the pin includes: a first male thread; a second male thread located further toward a tip than the first male thread and having a smaller diameter than the first male thread; a pin intermediate shoulder surface located between the first male thread and the second male thread; a pin end shoulder surface located at the tip of the pin; and a pin sealing surface located between the second male thread and the pin end shoulder surface;

the box includes: a first female thread adapted to be engaged by the first male thread when the connection is made up; a second female thread adapted to be engaged by the second male thread when the connection is made up; a box intermediate shoulder surface adapted to be in contact with the pin intermediate shoulder surface when the connection is made up; a box end shoulder surface corresponding to the pin end shoulder surface; and a box sealing surface located between the second female thread and the box end shoulder surface and adapted to be in contact with the pin sealing surface along an entire circumference when the connection is made up;

an axial distance between the box intermediate shoulder surface and the box end shoulder surface of the box before make-up, $L_B$, is larger than an axial distance between the pin intermediate shoulder surface and the pin end shoulder surface of the pin before make-up, $L_P$;

a difference between the axial distances, $(L_B-L_P)$, is such that, when the connection is made up and upon application of an axial compressive load, the pin end shoulder surface starts to be in contact with the box end shoulder surface before the threaded connection for pipe yields;

wherein the axial distances $L_B$ and $L_P$ are such that, when the connection is made up and no axial compressive load is applied, a clearance is formed between the pin end shoulder surface and the box end shoulder surface;

wherein each of the intermediate shoulder surfaces of the pin and box is constituted by a flat surface perpendicular to the pipe axis;

wherein the pin intermediate shoulder surface is constituted by a single flat surface from a section of the outer peripheral surface of the pin provided with the first male thread to a section of the outer peripheral surface of the pin provided with the second male thread; and wherein the box intermediate shoulder surface is constituted by a single flat surface from a section of the inner peripheral surface of the box provided with the first female thread to a section of the inner peripheral surface of the box provided with the second female thread.

6. The threaded connection for pipe according to claim 5, wherein:

the second male thread and the second female thread are constructed such that, when the connection is made up and no axial compressive load is applied, a clearance is formed between stab flanks of the second male thread and the second female thread; and the clearance between the stab flanks is of such a size that, as the applied axial compressive load gradually increases, the stab flanks first start to be in contact and then the pin end shoulder surface and the box end shoulder surface start to be in contact.

7. The threaded connection for pipe according to claim 6, wherein a slope of a straight line connecting ends, as determined along an axial direction, of the pin sealing surface is larger than 5% and smaller than 25%.

8. The threaded connection for pipe according to claim 5, wherein a slope of a straight line connecting ends, as determined along an axial direction, of the pin sealing surface is larger than 5% and smaller than 25%.

* * * * *